United States Patent

Botsolas

[11] 4,054,711
[45] Oct. 18, 1977

[54] COMPOSITE INSULATION JACKET

[75] Inventor: Christos J. Botsolas, New Brunswick, N.J.

[73] Assignee: Johns-Manville Corporation, Denver, Colo.

[21] Appl. No.: 670,017

[22] Filed: Mar. 4, 1976

Related U.S. Application Data

[63] Continuation of Ser. No. 379,342, July 16, 1973, abandoned.

[51] Int. Cl.² .................... B32B 17/02; D03D 15/12
[52] U.S. Cl. ................................. 428/228; 428/233; 428/421; 428/443; 428/285; 428/457; 428/458; 428/920; 428/286; 52/309.6; 428/246
[58] Field of Search ............... 428/228, 233, 246, 421, 428/443, 255, 457, 458, 285, 286; 52/309

[56] References Cited

U.S. PATENT DOCUMENTS

| | | | |
|---|---|---|---|
| 2,401,314 | 6/1946 | Quinn | 162/155 |
| 2,514,170 | 7/1950 | Walter et al. | 428/443 X |
| 2,523,022 | 9/1950 | Horstman | 428/443 X |
| 2,739,092 | 3/1956 | Stevenson | 154/93 |
| 3,037,895 | 6/1962 | Quinn | 154/44 |
| 3,212,960 | 10/1965 | Quinn | 428/443 X |
| 3,300,927 | 1/1967 | Bettoli | 428/421 |
| 3,369,959 | 2/1968 | Noyes | 161/164 X |

OTHER PUBLICATIONS

Zeston Brochure "PVF 1171" (published Nov. 1971, as acknowledged by appt. in Paper No. 3, p. 3), pp. 1–6.

Primary Examiner—P. C. Ives
Attorney, Agent, or Firm—Robert M. Krone; Joseph J. Kelly; James W. McClain

[57] ABSTRACT

A flexible multilayer jacketing material for covering bare pipes or thermal insulation on pipes, etc., is a composite of an interior surface film of a metalized polyethylene terephthalate with its aluminum coated internal face bonded to one face of a central layer of glass fiber-reinforced asbestos paper which has its other face bonded to an exterior surface film of polyvinyl fluoride.

12 Claims, 1 Drawing Figure

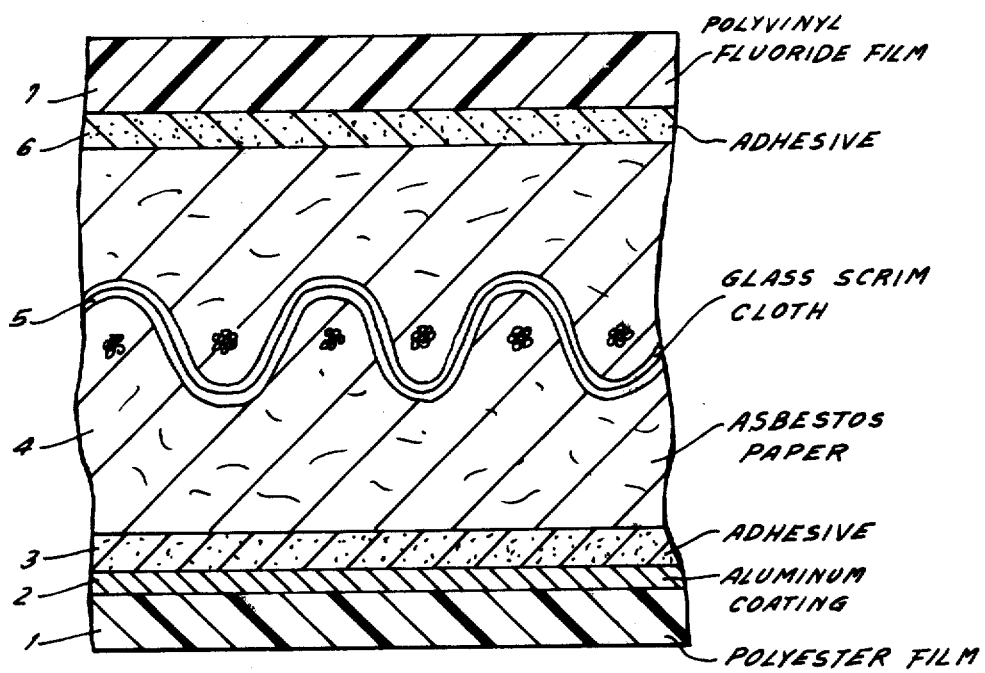

COMPOSITE INSULATION JACKET

This is a continuation of application Ser. No. 379,342, filed July 16, 1973, and now abandoned.

BACKGROUND OF THE INVENTION

CROSS-REFERENCE TO RELATED APPLICATION

Certain uses of the articles of this invention may involve subject matter described and claimed in my concurrently filed application Ser. No. 670,016 entitled "Laminated Insulation Blanket."

FIELD OF THE INVENTION

This invention is concerned with composite flexible insulation jackets for improving the thermal insulation of hot and cold pipes, vessels, tanks and ducts. Jackets constructed according to the invention also afford corrosion and flash fire protection for pipes, vessels, tanks, ducts, etc, and afford flash fire protection when used over walls, roofs, panels, etc.

PRIOR ART

A wide array of materials have employed or suggested for use in jacketing thermal insulation for a number of different reasons, including a neater appearance, protection against the weather and fastening the insulation to pipes. Alone or in various aggregations, these materials have included aluminum and other metallic casings, canvas, asbestos paper as well as coatings of numerous resinous materials. For example, Noyer U.S. Pat. No. 3,369,959 describes a laminate composed of polyvinyl fluoride on a neoprene-impregnated asbestos felt and mentions pipe jacketing among a number of architectural and automotive uses. One type of commercial insulation covering material employs fiber glass yarn patterns as a reinforcement between a flameretardant kraft paper and the face of aluminum foil to which that paper is bonded, and the foil may have a pigmented vinyl resin coating on its other face. Those reinforcing yarn patterns are usually rather prominently visible on both sides of the products; also the pigmented coating reduces the reflection of heat by the aluminum layer.

The flexible laminated jackets of the instant invention utilize known sheet materials but two of these have apparently never been employed as elements of such composite jacketing materials. Moreover, the present combinations and arrangements of layers and the components included therein are novel; and they provide unusual and improved combinations of desirable results, including some of an unexpected nature.

SUMMARY OF THE INVENTION

The present invention relates to a flexible laminated insulation jacket for covering bare pipes and equipment or their thermal insulation. The jacket comprises one or more of such features as a vapor barrier film or layer of synthetic resin which bears a vapor-deposited coating of a heat reflective metal on its internal unexposed face where it is protected against corrosion, or a layer of felted asbestos fibers containing reinforcing glass fibers, and especially the combination of both such layers with a continuous resin layer, preferably a fluorocarbon resin, as a protective external covering in a composite fire-resistive laminate.

Other aspects of the invention are concerned with more specific details, combinations or embodiments which may involve such items as a vapor barrier film of a linear polyester resin (e.g. transparent polyethylene terephthalate), a reflective aluminum coating on that film, a binder resin (e.g. polyvinyl chloride) in the asbestos layer, fiber glass scrim cloth in the asbestos layer, and a fluorocarbon resin, especially a polyvinyl fluoride film, as the external surface layer.

Still other aspects of the invention as well as its benefits and advantages will be apparent to those skilled in the art upon consideration of the following detailed disclosure.

DESCRIPTION OF THE DRAWING

The FIGURE shows one embodiment of an article of the invention in a greatly enlarged sectional view wherein relative thicknesses of the layers in the composite jacket material are somewhat distorted for the purpose of clearer illustration.

DESCRIPTION OF SPECIFIC EMBODIMENTS

The jacketing materials of the present invention are composite or laminar articles comprising at least two, and preferably three, principal layers of a flexible nature that are flexibly bonded into a unitary sheet material suitable for covering flat surfaces as well as those with simple curves. The many advantages of these novel materials are described hereinafter.

Turning now to the drawing for a general understanding of the structure of one modification of the laminated article, it depicts an enlarged cross-section through the thickness. This composite sheet is constructed by adhesively bonding the entire adjacent faces of three preformed sheet materials into an integral jacketing material having an improved combination of properties relative to prior art jackets. In this embodiment, the interior surface layer intended for contact with conventional thermal insulation surrounding a pipe, etc., or with the bar pipe itself in some applications, is a vapor barrier layer in the form of the polyester resin film 1 bearing a vapor-deposited ultrathin coating 2 of aluminum on its internal face. The metal side or face of this metallized resin is bonded by the adhesive 3 to one face of the central layer 4 of asbestos paper in which is embedded a reinforcing layer 5 of open mesh fiber glass scrim cloth, and layer 4 preferably contains a binder resin also. Another adhesive layer 6 serves to cement the other face of asbestos layer 4 to the inner face of the exterior surface layer 7 of polyvinyl fluoride film.

Although it is contemplated that the interior surface layer 1 of resin may be omitted in some embodiments of this invention when a vapor barrier is not needed, the resulting composite thereby loses some desirable qualities. That tough resin film serves to protect the asbestos layer 4 against physical damage; it provides a convenient, economical and commercially available carrier for the metal coating, a very light weight, flexible and efficient heat reflecting form of insulation; moreover, it protects one side of the thin metal layer 2 against corrosion by sealing the resin side of the metal coating against exposure to any vapors, gases, and liquids, and such corrosion would greatly impair its efficiency in reflecting heat radiation.

A wide variety of plastic compositions may be utilized for the surface film 1 in meeting the requirements of forming a film that is a suitable substrate for vapor metallization and displaying a low permeability for water vapor—for example, low enough for a composite jacket rating below about 2 perms, and preferably as low as possible. Linear polyesters, the polymeric reaction products of dihydroxy alcohols and dibasic organic acids, may be used; and excellent results are obtainable with metallized polyethylene terephthalate film. That film exhibits very low permeability for water vapor and hiigh dimensional stability in combination with good heat resistance. A resin that is transparent is preferred for obtaining the full benefit of the metal coating as a heat reflector.

It is also contemplated that other resins may be used for film 1 as exemplified by polyvinyl chloride, polyvinyl fluoride and other fluorocarbons, and even copolymers of vinyl chloride and vinylidene chloride in applications where shrinkage is no problem.

The metal coating may be any metal capable of reflecting heat and of being applied by conventional vapor deposition procedures to form a mirror-like coating 2 on the resin film. Thus, the metal may be aluminum, chromium, copper, nickel, silver, gold, etc., or alloys of these or other metals, but aluminum is generally preferred for good results and economy. Moreover, preformed polyethylene terephthalate film with a vapor deposition coating of aluminum on one side is currently available in adequate quantities at reasonable cost.

Thickness of the metallized vapor barrier layer may range widely, for instance from about 0.25 to 4 mils (thousandths of an inch), but it is typically between about 0.5 and 1.5 mils. The thickness of the vapor-deposited metal may be ignored as an ultrathin coating of less than 0.01 mil. However, in comparison wih an uncoated resin, that coating provides a much lower vapor permeability in the metallized resin film.

The felted asbestos layer 4 is another preformed item, and it is usually termed asbestos paper since it is formed from a slurry of individual asbestos fibers in water on a traveling wire screen similarly to paper-making operations. The reinforcing glass scrim cloth 5 is introduced at the proper interval in the process for a mid-depth location while the asbestos fibers are settling on the screen. Also, it is desirable for the slurry to contain a binder material, such as a latex of rubber or polyvinyl chloride, that remains flexible while increasing strength. A flexible polyvinyl chloride binder is generally preferred for its self-extinguishing property, and it may be present in an amount of about 10 to 30% (preferably about 15-20%) of the dry weight of the asbestos layer.

Layer 4 is the bulkiest layer in the composite for it typically is about 15 to 30 mil thick, and such bulk is helpful in minimizing "telegraphing" of the pattern of screm cloth on the surfaces of the jacket material. However, the fibrous asbestos layer may be as thick as 40 or more mils or as thin as about 10 mils depending considerably on the desired coefficient of conductive heat transfer through the jacket as well as its flexibility, for both properties are mainly dependent on the thickness of the asbestos layer.

The scrim cloth 5 may be woven from polyethylene terephthalate or nylon threads when maintaining the strength of the jacket at high temperatures is not important, but fiber glass threads are usually preferable. The weave of the cloth may have a thread count of from 2 × 2 up to 12 × 12, and an 8 × 8 count is typical.

The exterior skin or surface layer 7 is a continuous or unbroken flexible film of a solid resin as exemplified by polyvinyl chloride for indoor usage or fluorocarbon resins or acrylic resins, such as polymethyl methacrylate. The fluorocarbons are preferred for most purposes, but the expensive chlorotrifluoroethylene and tetrafluoroethylene polymers seldom, if ever, justify their extra cost over polyvinyl fluoride. The latter is being manufactured in the form of strong films of 0.5 to 4 mil thickness with various pigments incorporated therein. Polyvinyl fluoride film is an extremely durable preformed finish layer for exposure to all tpes of weather, common solvents, strong cleaning agents, corrosive liquids and gases.

Polyvinyl fluoride film is desirably rendered surface receptive to adhesive bonding by surface activation on both of its faces as may be accomplished according to the teachings of Simms U.S. Pat. No. 3,133,854, Usala et al. U.S. Pat. No. 3,228,823 and Noyes U.S. Pat. No. 3,369,959. Those patents are incorporated herein by reference as subordinate disclosures relative to such background on surface activation and to some of the adhesives for activated polyvinyl fluoride surfaces. In addition to the epoxy resins, vinyl addition polymers, polyalkyl acrylates and other adhesives mentioned therein, one may employ the cements based on synthetic rubbers as described in Saunders et al. U.S. Pat. No. 2,376,854, which is also incorporated herein by reference. In general, an elastomeric adhesive is preferred for forming flexible bonds between the flexible layers. The aforesaid adhesives may be employed as the bonding agents for both faces of the central asbestos felt layer 4, that is in both of the thin layers 3 and 6. In the case of adhesive layer 6, even when the exterior resin skin 7 is pigmented, it is often desirable for maximum resistance to deterioration from prolonged exposure to sunlight to incorporate in the adhesive an agent capable of resisting such degradation. Such agents are well known and exemplified by the carbon black mentioned in certain of the aforesaid patents or an ultraviolet absorber, such as a compatible substituted benzophenone or substituted benzotriazole selected from those listed in the chart on pages 1008-1009 of the 1969-1970 Modern Plastics Encyclopedia of Breskin Publications, Inc., Bristol, Connecticut.

To illustrate the method of forming a specific composite jacket material according to this invention, an adhesive coating is applied to one of the two activated faces of a 1.5 mil thick web of a suitable commercially available polyvinyl fluoride by passing the web through a conventional coating device containing a solution of a synthetic rubber adhesive of the butadieneacrylonitrile type in a naphtha-based solvent, which is also commercially available. Next, the adhesive coating is dried during travel of the web through an oven; then the coated side of the plastic web is laminated in contact with one face of a web of a 25-mil thick suitable asbestos paper product that is advantageously reinforced, as by an internal glass fiber scrim cloth of 8 × 8 count and including a polyvinyl chloride binder resin. The bonding is accomplished by passage of the assembled webs through nip rolls with an unheated rubber roll bearing on the exposed polyvinyl fluoride face while a heated steel roll bears on the asbestos paper side. Thereafter, in similar procedures, a suitably metallized 0.9 mil web of polyethylene terephthalate is coated on its metallized face of vapor-deposited aluminum with the same synthetic rubber adhesive, oven dried and laminated onto the asbestos face of the asbestos-polyvinyl fluoride composite in the same nip rolls.

The particular jacketing material produced in the aforesaid procedure has an overall thickness of 25 mils, the same as the original thickness of the reinforced asbestos layer, as a result of the compacting of that layer by the nip rolls. It possesses a tensile strength that is usually well in excess of 50 pounds per inch of width and a vapor barrier rating of 0.02 perm (water transmission in grams per hour per square foot per inch mercury pressure differential). The composite material may be successfully employed in covering thermal insulation having surface temperatures ranging from far below zero (e.g., −200° F.) up to the 325°–375° F. range, and the maximum temperature can be extended to 400° F. or more when the vapor barrier resin layer 1 is omitted from the lay-up.

In addition, the aforementioned laminate has greater flame resistance than pure aluminum which melts at approximately 1220° F. and is the most common jacket for outdoor pipe insulations. The new composite has successfully withstood oven temperatures of 1500° F. with the glass reinforcing threads remaining intact, shielded by the asbestos; and there are indications that it will withstand higher temperatures and may provide fire resistance at temperatures ranging up to about 2000°. Still other properties and advantages of such jacket material are set forth hereinafter.

The instant composites may be used for covering practically any type of thermal insulation, including calcium silicate, foamed glass and ceramic materials, such plastic foams as polyurethane and polystyrene foams, corrugated asbestos paper, fiber glass and mineral wools in batts and blankets, etc. These jackets can be employed for covering such kinds of insulation on piping systems, tanks, vessel, ducts and almost all types of insulated equipment. It may be desirable in some instances to cover bare pipes and other uninsulated surfaces with the present jackets, for example, as protection against corrosive liquids and gases as may be encountered in chemical plants, etc.

The composites of this invention can be easily fitted and fastened with the resiin film 7 on the outside as the exposed surface layer and the vapor barrier resin layer 1 in direct contact with surface of the insulation or surface to be covered. Only simple conventional hand tools, such as scissors or knife, ruler, stapler and brush, are needed. The joints are generally overlapped and cemented with a contact adhesive (e.g., a synthetic rubber-phenolic resin type) which will bond the overlapping several inch wide margin or portion of resin layer 1 to the underlying marginal area of the bondable surface of resin layer 7, (e.g., an activated fluorocarbon resin surface) of the jacket. Alternatively, the overlapped seam may be fastened with staples, desirably made of monel or other corrosion-resistant alloy; but it is often preferable to both staple and cement many joints. In applications where a vapor or liquid barrier is necessary or desirable, or merely for improving the appearance of the installation, the staples and overlapped seams may be sealed with a suitable tape. A tape matching the exterior resin layer 7 is generally preferred; for instance, covering and sealing an exterior film of polyvinyl fluoride with a polyvinyl fluoride tape of the same composition, color and thickness and two-sided activation, but also bearing a coating of a pressure-sensitive adhesive which is protected by a readily releasable paper liner. The prior surface receptive treatment of the polyvinyl fluoride film assures durable adhesion of the adhesive face of the tape to both the exposed surface of the exterior layer of the jacket and to the uncoated surface of the tape itself.

The unique combinations of structural features in the present composite jackets provide outstanding combinations of desirable properties and larger numbers of such benefits than were available in prior art jacket materials, including some advantages which are unique. Moreover, certain of the structural arrangements produce complementary or cooperative effects. For illustration, in the asbestos layer 4, the embedded glass fiber strands of scrim cloth 5 greatly reinforce the strength of the felted asbestos but they have a much lower melting point and flame resistance than the asbestos; however, the asbestos covers and insulates the glass fibers, and this protection enables the glass fibers to maintain a substantial strengthening of the asbestos layer even when the surface temperatures of the outer face of the asbestos exceed the softening or melting temperature of the strengthening agent, the glass fibers. These complementary protective effects are particularly significant in installations where flash fires may occur and it is important to shield pipe or equipment surfaces from contact with flames. Without the reinforcing fiber glass threads, the binder resin in the asbestos paper would decompose with a resulting loss of binding properties, and the asbestos paper would tend to collapse or tear from the asbestos fibers falling apart at temperatures at which a combined glass filber and asbestos layer would retain its configuration and substantial strength from its intact glass strands embedded in shielding asbestos that is held together mainly by those glass strands.

Somewhat similarly, the internal disposition of the metal coating 2 enables its covering transparent resin layer 1 to protect the metal against corrosion from acid, alkaline, oxidizing or other corrosive substances (e.g., during careless storage or from the alkali present in some insulating materials) and thus to maintain its efficiency in reflecting heat radiation. Another cooperative effect resides in the fact that the metal coating greatly enhances the vapor barrier effect of the resin film and permits obtaining very low perm ratings with a very thin and flexible metallized resin film. For instance, the moisture vapor permeability of uncoated polyethylene terephthalate film is typically of the order of ten times that of the same film bearing an ultrathin coating of vapor-deposited aluminum.

The inhalation of air-borne dust particls or fine fibers of asbestos has recently been found to be a occupational health hazard for works handling asbestos. However, the surface layers 1 and 7 completely cover the faces of the asbestos layer 4 and thereby minimize or eliminate that hazard, so far as that embodiment of the present jacket material is concerned, for personnel applyiing it to insulation or any other surface. Moreover, in a preferred embodiment of the invention using an asbestos paper impregnated with a substantial amount of a flexible binder agent, the asbestos hazard is likewise minimized or eliminated for workers making the present laminated jackets. A flexible asbestos paper impregnated with a latex of either rubber or polyvinyl chloride can be soaked in water without the delamination which occurs with untreated asbestos paper. Polyvinyl chloride is the preferred binder in view of its self-extinguishing property. The fibrous asbestos serves as the major insulating component within the jacket for minimizing conductive heat losses as well as providing outstanding flame resistance.

The exterior skin 7 provides resistance to the weather and soiling from various causes, and in the case of fluorocarbons, there is outstanding resistane to wind, rain, snow, sandstorms and microorganisms. For example, the preferred polyvinyl fluoride film is tough, abrasionresistant and inert, so it is unaffected by substantially all of the strongest common cleaning solvents and detergents, acids and alkalis at room temperature and usually at elevated temperatures. Its pigmented modifications are generally unmatched in fade resistance and strength retention under outdoor conditions or buried in soil. In addition, it has a low moisture absorption of only 0.5%, coupled with high tensile, tear, impact and burst strengths; also it is suitable for continuous use at 225° F. and its zero strength temperature is in the 500°-570° range.

The present composite jackets have an exceptional array or combination of properties that provide an unusually wide field of use of efficiently jacketing hot or cold equipment or its thermal insulation under any atmospheric or soil burial conditions as well as most corrosive conditions likely to be encountered. In addition to their suitability for continuous use at substantially elevated temperatures for periods that are expected to exceed 20 years, the new jackets have an unusual degree of fire resistance in respect to retaining their basic configurations at very high temperatures and displaying desirably low smoke ratings. These laminated jackets are tough and flexible enough so that they may be walked on without cracking or loss of vapor barrier properties; and they resist scruffing, abrasion and accidental punctures as well as tearing from stapling; thus they do not present the maintenance problems of conventional jackets, mastics, etc. Also the instant jacket materials require no painting or repainting, and any surfaces that are soiled, greasy or contaminated with fungi or bacterial growths from external sources can readily be cleaned and/or disinfected without damage using powerful agents including steam, hot water with soap or strong detergents, all commercial organic solvents and disinfectants. The instant insulation jackets can also be removed for repairing jacketed pipes and equipment and subsequently replaced in an installation that substantially matches the original in efficiency and best appearance.

While only a few embodiments of the present invention are described herein for purposes of a full and detailed disclosure, it will be apparent to those skilled in the art that other modifications of such articles are within the purview of the invention. Accordingly, the instant invention should not be construed as limited in any particulars except as may be recited in the appended claims or required by the prior art.

What is claimed is:
1. A flexible composite laminated insulation jacket, which consists essentially of:
    a. a vapor barrier layer consisting essentially of a first polymeric film having deposited on the interior face thereof a thin coating of a reflective metal, said polymeric film being selected from the group consisting of polyester and halocarbon polymeric film;
    b. a fibrous insulating layer consisting essentially of asbestos fiber reinforced with an open mesh scrim cloth; and
    c. an exterior layer consisting essentially of a second polymeric film selected from the group consisting of halocarbon and acrylic polymeric films;
    the metal coated face of said first polymeric film being adhered to one face of said fibrous insulating layer, and the other face of said fibrous insulation layer being adhered to said second polymeric film.

2. The article of claim 1 wherein said first polymeric film consists essentially of a polyester film.

3. The article of claim 2 wherein said polyester film is transparent.

4. The article of claim 3 wherein said transparent polyester film consists of essentially of polyethylene terephthalate film.

5. The article of claim 1 wherein said scrim cloth is woven from fiberglass, polyethylene terephthalate, or nylon threads.

6. The article of claim 5 wherein said scrim cloth is woven from fiberglass threads.

7. The article of claim 1 wherein said second polymeric film is a halocarbon polymer film.

8. The article of claim 7 wherein the halocarbon polymer is a polyvinyl chloride resin or a fluorocarbon resin.

9. The article of claim 8 wherein the halocarbon polymer is polyvinyl chloride or polyvinyl fluoride.

10. The article of claim 9 wherein the halocarbon polymer is polyvinyl fluoride.

11. The article of claim 1 wherein said reflective metal is aluminum, chromium, copper, nickel, silver, gold, or alloys thereof.

12. The article of claim 11 wherein said reflective metal is aluminum.

* * * * *